(12) United States Patent
Strecker

(10) Patent No.: US 12,139,220 B2
(45) Date of Patent: Nov. 12, 2024

(54) METHOD FOR OPERATING A STEERING SYSTEM

(71) Applicant: Robert Bosch GmbH, Stuttgart (DE)

(72) Inventor: Joerg Strecker, Pluederhausen (DE)

(73) Assignee: Robert Bosch GmbH, Stuttgart (DE)

( * ) Notice: Subject to any disclaimer, the term of this patent is extended or adjusted under 35 U.S.C. 154(b) by 233 days.

(21) Appl. No.: 17/907,713

(22) PCT Filed: Feb. 4, 2021

(86) PCT No.: PCT/EP2021/052687
§ 371 (c)(1),
(2) Date: Sep. 29, 2022

(87) PCT Pub. No.: WO2021/197690
PCT Pub. Date: Oct. 7, 2021

(65) Prior Publication Data
US 2023/0130338 A1 Apr. 27, 2023

(30) Foreign Application Priority Data
Apr. 3, 2020 (DE) ............. 10 2020 204 334.5

(51) Int. Cl.
*B62D 6/00* (2006.01)
*B62D 5/04* (2006.01)
(52) U.S. Cl.
CPC ........... *B62D 6/002* (2013.01); *B62D 5/0421* (2013.01)
(58) Field of Classification Search
CPC .............................. B62D 6/002; B62D 5/0421
See application file for complete search history.

(56) References Cited

U.S. PATENT DOCUMENTS

2006/0006020 A1 1/2006 Ono et al.
2016/0057921 A1* 3/2016 Pickett ................. A01B 69/008
701/41

(Continued)

FOREIGN PATENT DOCUMENTS

CN 101044053 A 9/2007
CN 102686473 A 9/2012

(Continued)

OTHER PUBLICATIONS

International Search Report corresponding to PCT Application No. PCT/EP2021/052687, mailed May 7, 2021 (German and English language document) (5 pages).

*Primary Examiner* — Long T Tran
(74) *Attorney, Agent, or Firm* — Maginot, Moore & Beck LLP

(57) ABSTRACT

A method is for operating a steering system, more particularly a steer-by-wire steering system. The steering system includes at least one wheel steering angle control element which is provided to influence and/or change a wheel steering angle of at least one vehicle wheel depending on a target specification signal correlated with a steering specification. The wheel steering angle control element has a limited maximum wheel steering angle control range for changing the wheel steering angle, and the target specification signal is limited by a saturation to the maximum wheel steering angle control range. The target specification signal is modified in such a manner that the, more particularly modified, target specification signal has a constant and differentiable curve at least in an edge range of the wheel steering angle control range.

11 Claims, 4 Drawing Sheets

(56) References Cited

U.S. PATENT DOCUMENTS

| | | | |
|---|---|---|---|
| 2016/0272237 A1* | 9/2016 | Kawamura | B62D 5/0469 |
| 2018/0141546 A1* | 5/2018 | Ko | B60W 30/09 |
| 2020/0086911 A1 | 3/2020 | Stahl et al. | |
| 2020/0156701 A1* | 5/2020 | Yamamoto | B62D 6/008 |

FOREIGN PATENT DOCUMENTS

| | | |
|---|---|---|
| CN | 103889824 A | 6/2014 |
| DE | 10 2009 014 392 A1 | 10/2009 |

\* cited by examiner

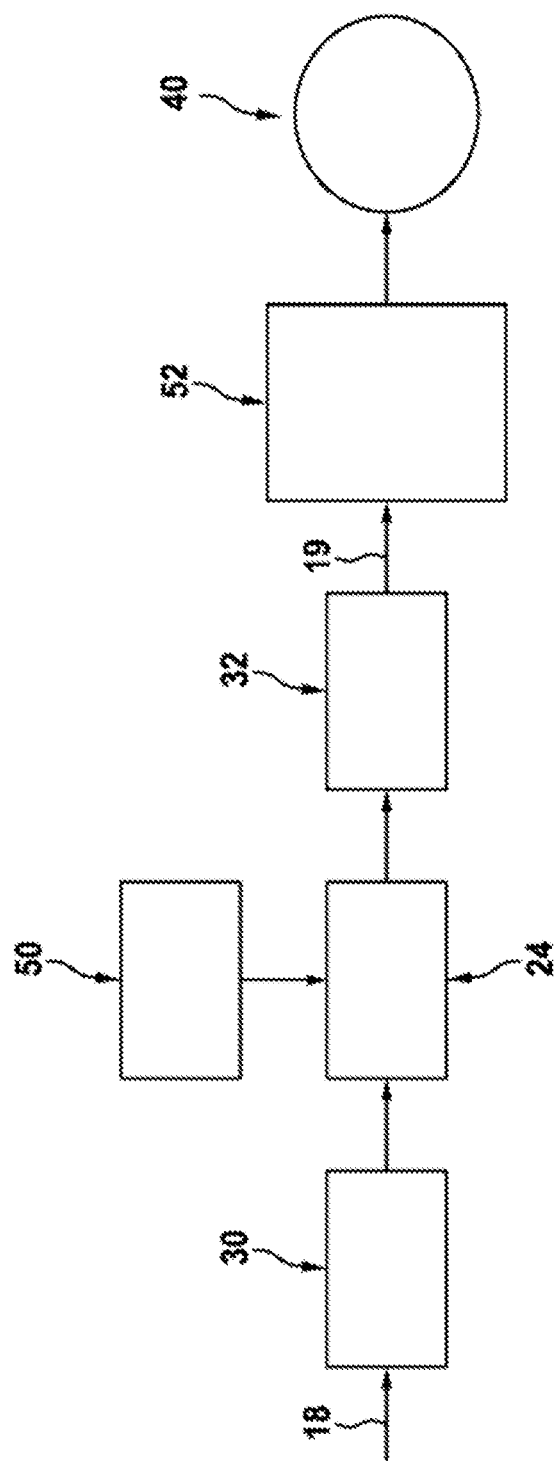

METHOD FOR OPERATING A STEERING SYSTEM

This application is a 35 U.S.C. § 371 National Stage Application of PCT/EP2021/052687, filed on Feb. 4, 2021, which claims the benefit of priority to Serial No. DE 10 2020 204 334.5, filed on Apr. 3, 2020 in Germany, the disclosures of which are incorporated herein by reference in their entirety.

BACKGROUND

The disclosure is based on a method for operating a steering system according to the preamble of claim 1. In addition, the disclosure relates to a control unit for carrying out such a method and to a steering system comprising such a control unit.

Vehicles which comprise a conventional steering system with a steering input element, for example in the form of a steering wheel, a wheel steering angle adjuster in the form of a steering gear, and a steering column for mechanical connection of the steering input element to the wheel steering angle adjuster are known from the prior art. In addition, vehicles with steer-by-wire steering systems are known which manage without a direct mechanical connection between a steering input element and steered vehicle wheels and in which a steering specification at the steering input element is transmitted exclusively electrically. The latter generally comprise a steering input unit and at least one wheel steering angle adjuster that is mechanically separate from the steering input unit. In both cases, the wheel steering angle adjuster has a maximum wheel steering angle adjustment range limited, for example, by two mechanical end stops. In addition, such wheel steering angle adjusters generally comprise a steering actuator, for example in the form of an electric motor, which can be controlled by means of a target specification signal to support or implement a steering specification.

In certain situations and/or due to certain system properties of the steering system, it may be that the target specification signal specifies a value that lies outside the maximum wheel steering angle adjustment range, which disturbs operation of the steering system. For this reason, various limiting methods are used to limit the target specification signal to the maximum wheel steering angle adjustment range. However, such limitations of the target specification signal can cause discontinuities, edges and/or kinks in the target specification signal, which can lead to abnormalities in the operation of the steering actuator, vibrations in a steering mechanism, and/or acoustic problems.

Proceeding from this, the object of the disclosure is in particular to provide a method for operating a steering system having improved properties with regard to a mode of operation. The object is achieved by the features of claims 1, 10 and 11, while advantageous embodiments and developments of the disclosure can be taken from the dependent claims.

SUMMARY

The disclosure is based on a method for operating a steering system, wherein the steering system comprises at least one wheel steering angle adjuster, which is advantageously operatively connected to a steering input element of the steering system and is provided to influence and/or change a wheel steering angle of at least one vehicle wheel depending on a target specification signal, which is correlated with a steering specification, advantageously at the steering input element, wherein the wheel steering angle adjuster has a maximum wheel steering angle adjustment range, which is limited, in particular mechanically and/or by software, for changing the wheel steering angle, and wherein the target specification signal is limited by means of saturation to the maximum wheel steering angle adjustment range.

It is proposed that the target specification signal, in particular in the saturation range, is modified in such a manner that the, in particular modified, target specification signal has a constant and differentiable curve.

The target specification signal can correspond here in particular to a target wheel steering angle or a target position of a steering adjustment element of the wheel steering angle adjuster. This embodiment can in particular improve the operation of the steering system. In particular, a harmonic curve of the target specification signal can be achieved, whereby abnormalities and/or vibrations during operation of the steering system and/or acoustic problems can be advantageously reduced.

In particular, the steering system could be formed as a conventional steering system and could comprise, for example, superimposed steering and/or active steering. Preferably, however, the steering system is formed as a steer-by-wire steering system. Furthermore, the steering system can comprise further components and/or assemblies, such as at least one steering input unit, which in particular comprises the steering input element and can be provided at least to detect a steering specification, and/or at least one control unit, which is provided in particular to electrically couple the steering input unit and the at least one wheel steering angle adjuster. In this context, a "wheel steering angle adjuster" is to be understood in particular as a unit which is connected to at least one vehicle wheel of the vehicle and is provided to transmit a steering specification, in particular from the control unit or advantageously from a driver at the steering input element, to the vehicle wheel by changing a wheel steering angle of at least one vehicle wheel and thereby advantageously to control at least an orientation of the vehicle wheel and/or influence a direction of travel of the vehicle. For this purpose, the wheel steering angle adjuster advantageously comprises at least one steering adjustment element, for example in the form of a toothed rack, and at least one steering actuator, for example in the form of an electric motor, which is operatively connected to the steering adjustment element. Furthermore, the wheel steering angle adjuster can advantageously comprise at least one end stop, in particular a mechanical end stop and/or software end stop, and preferably at least two end stops, in particular mechanical end stops and/or software end stops, which limit the maximum wheel steering angle adjustment range. The wheel steering angle adjuster can furthermore be formed as a single wheel adjuster and can be assigned to exactly one vehicle wheel, in particular which is steerable and preferably formed as a front wheel, or preferably can be formed as a central adjuster and can be assigned to at least two vehicle wheels, which in particular are steerable and preferably formed as front wheels.

Furthermore, the control unit is provided to carry out the method for operating the steering system. In the present case, the control unit is provided in particular at least to limit the target specification signal by means of saturation to the maximum wheel steering angle adjustment range. For this purpose, the control unit can in particular comprise at least one limiting unit, in particular one that is at least partially electrical and/or electronic. The limiting unit is advantageously provided to limit the target specification signal to a limit value, correlated in particular with a maximum value of the wheel steering angle adjustment range, when the maximum wheel steering angle adjustment range is exceeded and/or for providing the limit value as a target specification signal when the maximum wheel steering angle adjustment range is exceeded. Furthermore, the control unit is provided at least to modify the target specification signal, in particular in the saturation range, in such a way that the, in particular modified, target specification signal has a continuous and differentiable curve at least in the boundary region of the wheel steering angle adjustment range. For this purpose, the control unit can in particular comprise at least one computing unit, in particular one that is at least partially electrical and/or electronic and is operatively connected to the limiting unit. Preferably, the control unit is additionally provided to control the wheel steering angle adjuster depending on the, in particular limited and/or modified, target specification signal, in such a way that the target specification signal is adjusted. For this purpose, the control unit can in particular comprise at least one controller unit, in particular one that is at least partially electrical and/or electronic and is operatively connected to the computing unit, and that is provided to control a position of the steering adjustment element. Advantageously, the controller unit for moving and/or adjusting the steering adjustment element cooperates here with the steering actuator. Furthermore, in the present case, the target specification signal is advantageously determined depending on a steering specification at the steering input element and an, in particular, predefined and/or adjustable overall steering ratio of the steering system, in particular between the steering input element and steered vehicle wheels, and is preferably implemented, preferably adjusted, by the wheel steering angle adjuster and/or a corresponding actuation of the wheel steering angle adjuster. Alternatively or additionally, however, the control unit can also be provided, in particular by means of the computing unit, to provide the steering specification automatically, such as in an automated and/or autonomous driving mode. In this case, the target specification signal is advantageously determined depending on the steering specification of the control unit.

Furthermore, a "maximum wheel steering angle adjustment range" is to be understood in particular as a maximum range within which a deflection and/or movement of the wheel steering angle adjuster, in particular of the steering adjustment element, and/or a change in the wheel steering angle of the corresponding vehicle wheel or vehicle wheels is possible. In addition, a "boundary region" is to be understood in particular as a partial range of the maximum wheel steering angle adjustment range, which includes a boundary value, in particular a maximum value, of the maximum wheel steering angle adjustment range and in particular comprises at most 20%, preferably at most 10%, and particularly preferably at most 5% of the entire wheel steering angle adjustment range. Preferably, at least one boundary value of the boundary region is identical here to the boundary value of the wheel steering angle adjustment range. The term "provided" is to be understood in particular to mean specially programmed, configured and/or equipped. Since an object is provided for a specific function, it is to be understood in particular that the object fulfills and/or executes this specific function in at least one application and/or operating state.

Modification of the target specification signal could, for example, be implemented purely by software, such as by means of a corresponding computing algorithm of the computing unit. However, it is advantageously proposed that at least one filter, in particular with a dynamically adaptable cut-off frequency, is used to modify the target specification signal. Particularly advantageously, a cut-off frequency of the filter is dynamically adapted depending on a, in particular current, target position of a steering adjustment element of the wheel steering angle adjuster, in particular of the aforementioned steering adjustment element. Advantageously, the filter is part of the limiting unit. Preferably, the computing unit is provided to dynamically adjust the cut-off frequency, in particular depending on the target position of the steering actuation element. This can in particular simplify a control algorithm and/or a computing algorithm for providing a target specification signal with a harmonic curve.

It is also proposed that a difference between a maximum value of the, in particular maximum, wheel steering angle adjustment range and the target position of the steering adjustment element is determined for dynamic adaptation of the cut-off frequency, whereby a distance of the steering adjustment element to the corresponding end stop can be determined advantageously easily. Preferably, the computing unit is provided to determine a difference between a maximum value of the, in particular maximum, wheel steering angle adjustment range and the target position of the steering adjustment element for dynamic adaptation of the cut-off frequency.

Particularly advantageously, a characteristic curve is used for dynamic adaptation of the cut-off frequency, in particular one that is dependent on the target position of the steering adjustment element and/or on the difference between the maximum value of the, in particular maximum, wheel steering angle adjustment range and the target position of the steering adjustment element. Preferably, the selection of the, in particular required, cut-off frequency is thus made via the characteristic curve and in particular depending on the target position of the steering adjustment element and/or depending on the difference between the maximum value of the, in particular maximum, wheel steering angle adjustment range and the target position of the steering adjustment element. Preferably, the computing unit is provided to use the characteristic curve for dynamic adaptation of the cut-off frequency. This makes it advantageously easy to determine, in particular, the required cut-off frequency.

Furthermore, a particularly efficient control can be achieved in particular if a direction of movement of the steering adjustment element is taken into account during the dynamic adaptation of the cut-off frequency. Preferably, the computing unit is provided to take into account the direction of movement of the steering adjustment element when dynamically adapting the cut-off frequency. It is thus possible advantageously to distinguish between steering into the limitation and/or saturation and steering out of the limitation or saturation. Preferably, the target specification signal is modified when steering into the limitation and/or saturation and when steering out of the limitation and/or saturation. In addition, a modification of the target specification signal preferably differs when steering into the limitation and/or saturation and when steering out of the limitation and/or saturation. Preferably, the target specification signal is also modified when steering into the limitation and/or saturation exclusively in the boundary region of the, in particular maximum, wheel steering angle adjustment range, and when steering out of the limitation and/or saturation in the boundary region of the, in particular maximum, wheel steering angle adjustment range and outside the boundary region of the, in particular maximum, wheel steering angle adjustment range and/or in a sub-range of the, in particular maximum, wheel steering angle adjustment range that is wider than the boundary region.

It is also proposed that the filter is configured and/or the cut-off frequency is set in such a way that a substantial modification of the target specification signal, in particular by means of the filter, takes place exclusively in the boundary region of the, in particular maximum, wheel steering angle adjustment range. Preferably, the filter is thus configured and/or the cut-off frequency is set in such a way that the target specification signal is unchanged in a partial range of the wheel steering angle adjustment range deviating from the edge range, as is advantageous when steering into the limitation and/or saturation, or is almost unchanged, as is advantageous when steering out of the limitation and/or saturation. In this way, it can be ensured in particular that the target specification signal is changed only in a sub-range of the wheel steering angle adjustment range that is classified as critical and is otherwise modified as little as possible.

The filter could, for example, be formed as a PT1 filter or PT1 member. According to a particularly preferred embodiment, however, it is proposed that the filter is formed as a PT2 filter or PT2 member, whereby a continuous and differentiable curve can be achieved particularly easily both at the beginning of a signal change and at the end of a signal change. In addition, a particularly uniform and/or harmonic modification of the target specification signal can be achieved, in particular in the boundary region.

It is additionally proposed that at least one limiting element is used to limit the target specification signal and by means of said at least one limiting element the target specification signal is limited to a limit value correlated with a maximum value of the, in particular maximum, wheel steering angle adjustment range. The limiting element is preferably arranged here upstream of the filter in terms of circuitry. Advantageously, the limiting element is also part of the limiting unit. This can increase operational reliability in particular.

A particularly high level of operational reliability can be achieved in particular if at least two limiting elements are used for limiting the target specification signal, wherein a first limiting element of the limiting elements is arranged upstream of the filter in terms of circuitry and a second limiting element of the limiting elements is arranged downstream of the filter in terms of circuitry. Preferably, identical limiting elements are used here. Furthermore, the limiting elements are preferably part of the limiting unit.

The method for operating the steering system, the control unit and the steering system are not intended to be limited here to the application and embodiment described above. In particular, the method for operating the steering system, the control unit, and the steering system can have a number of individual elements, components and units deviating from a number specified herein in order to fulfill a mode of operation described herein.

BRIEF DESCRIPTION OF THE DRAWINGS

Further advantages will be provided from the following description of the drawings. The drawings show an exemplary embodiment of the disclosure.

Specifically:

FIG. 3 shows an exemplary signal flow diagram of a method for operating the steering system.

DETAILED DESCRIPTION

Figure 1:
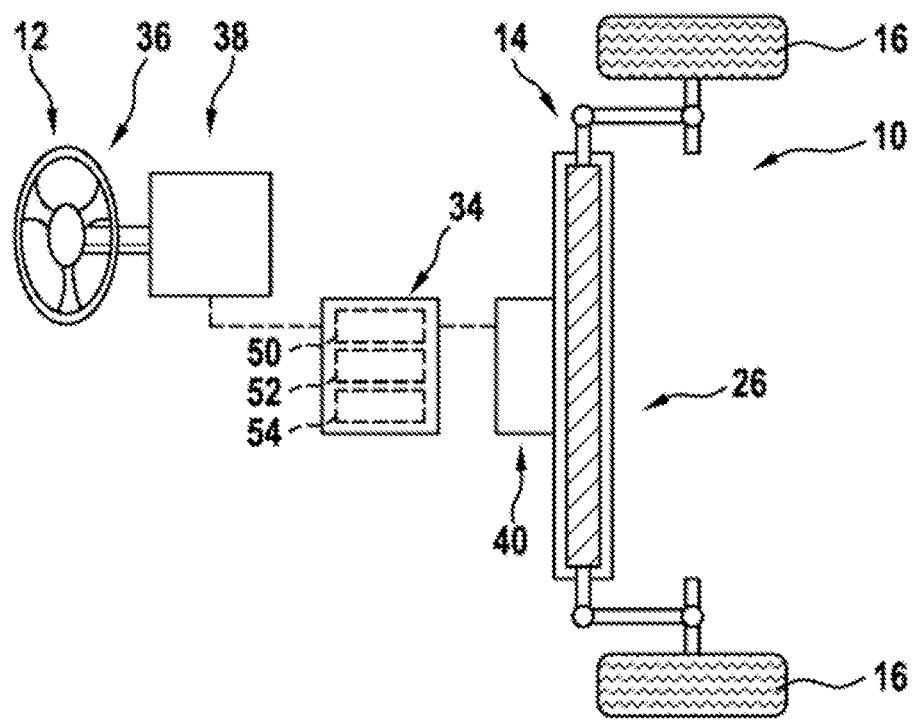
FIG. 1 shows a simplified representation of a steering system formed by way of example as a steer-by-wire steering system.

FIG. 1 shows an exemplary steering system 10 in perspective. The steering system 10 is provided for use in a vehicle (not shown), in particular a motor vehicle. In particular, the vehicle can be formed as a passenger vehicle and/or commercial vehicle. When installed, the steering system 10 is operatively connected to vehicle wheels 16 of the vehicle and is provided to influence a direction of travel of the vehicle. Furthermore, the steering system 10 in the present case is formed as a steer-by-wire steering system in which a steering specification is transmitted exclusively electrically to the vehicle wheels 16 in at least one operating state. In principle, however, a steering system could also be formed as superimposed steering and/or active steering.

The steering system 10 comprises a steering input unit 36. The steering input unit 36 comprises a steering input element 12, for example in the form of a steering wheel. In addition, the steering input unit 36 comprises a feedback actuator 38, in particular mechanically coupled to the steering input element 12. The feedback actuator 38 is provided at least to generate a steering resistance and/or a feedback torque to the steering input element 12. Alternatively, a steering input element could also be formed as a joystick, as a steering lever and/or as a steering ball or the like. Furthermore, a feedback actuator could in principle also be omitted. It is additionally also conceivable to completely omit a steering input unit.

In addition, the steering system 10 has a wheel steering angle adjuster 14. The wheel steering angle adjuster 14 is mechanically separate from the steering input unit 36. The wheel steering angle adjuster 14 is connected to the steering input unit 36 purely electrically. Furthermore, the wheel steering angle adjuster 14 is formed by way of example as a central adjuster. The wheel steering angle adjuster 14 is operatively connected to at least two of the vehicle wheels 16, in particular two front wheels, and is provided to generate a steering movement of the vehicle wheels 16. For this purpose, the wheel steering angle adjuster 14 comprises a steering adjustment element 26, formed by way of example as a toothed rack, and a steering actuator 40, which interacts with the steering adjustment element 26 and is formed as an electric motor. In principle, a steering system could of course also comprise a plurality of wheel steering angle adjusters, in particular in the form of individual wheel adjusters.

Figure 2:
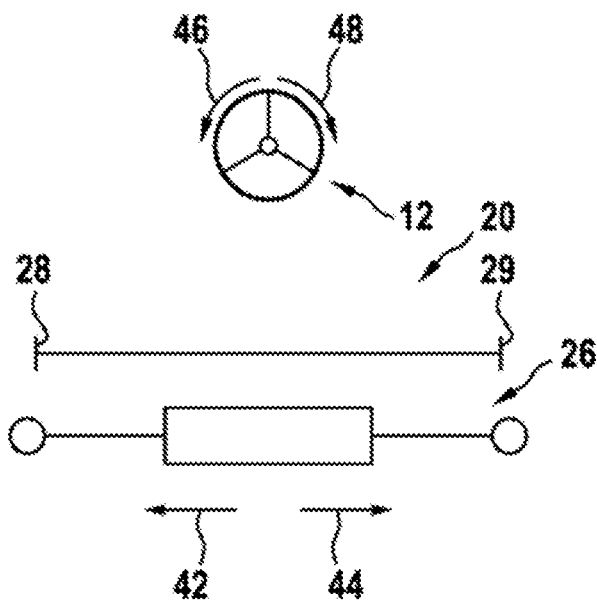
FIG. 2 shows a schematic representation of a wheel steering angle adjustment range of a wheel steering angle adjuster of the steering system.

In the present case, the wheel steering angle adjuster 14 is provided to change a wheel steering angle of the vehicle wheels 16 depending on a steering specification. For this purpose, the wheel steering angle adjuster 14 has a maximum wheel steering angle adjustment range 20, for example limited by two mechanical end stops (not shown) (cf. in particular FIG. 2). The maximum wheel steering angle adjustment range 20 defines and/or limits a maximum deflection and/or movement, in particular rotational movement, of the vehicle wheels 16. In the present case, the maximum wheel steering angle adjustment range 20 defines and/or limits a maximum deflection and/or movement, in particular translational movement, of the steering adjustment element 26 by way of example. The wheel steering angle adjustment range 20 comprises a first maximum value 28, which in the present case defines and/or limits a maximum deflection and/or movement of the steering adjustment element 26 in a first direction 42, and a second maximum value 29, which in the present case defines and/or limits a maximum deflection and/or movement of the steering adjustment element 26 in a second direction 44, in particular opposite the first direction 42. Furthermore, a deflection and/or movement of the steering input element 12 in a first steering direction 46 causes a deflection and/or movement of the steering adjustment element 26 in the first direction 42, and a deflection and/or movement of the steering input element 12 in a second steering direction 48, in particular opposite the first steering direction 46, causes a deflection and/or movement of the steering adjustment element 26 in the second direction 44. In principle, however, a steering system could also comprise a software end stop. In addition, it is also conceivable to completely omit an end stop and to implement a purely software-based limitation of a wheel steering angle adjustment range.

Furthermore, the steering system 10 has a control unit 34. The control unit 34 is consequently formed as a steering control unit. The control unit 34 has an electrical connection to the wheel steering angle adjuster 14. The control unit 34 further comprises an electrical connection to the steering input unit 36. The control unit 34 couples the wheel steering angle adjuster 14 and the steering input unit 36 to each other. The control unit 34 is provided to control an operation of the steering system 10. The control unit 34 is provided to control the steering actuator 40 depending on a signal of the steering input unit 36, in particular depending on a target specification signal 18 correlated with a steering specification. In the present case, the target specification signal 18 is provided depending on a steering specification at the steering input element 12 and an overall steering ratio of the steering system 10, in particular a predefined and/or adjustable steering ratio. The control unit 34 is further provided to control the feedback actuator 38 depending on a signal of the wheel steering angle adjuster 14. In principle, a control unit could also be integrated into a wheel steering angle adjuster or a steering input unit. In addition, a control unit could also be different from a steering control unit and, for example, could be formed as a central control unit of a vehicle. Furthermore, a steering specification could in principle also be provided directly by a control unit, for example in an autonomous driving mode, so that a target specification signal is determined depending on the steering specification of the control unit. It is also conceivable to take other operating variables into account when determining a target specification signal, such as a steering speed.

The control unit 34 comprises a computing unit 50. The computing unit 50 comprises at least one processor (not shown), for example in the form of a microprocessor, and at least one operating memory (not shown). In addition, the computing unit 50 comprises at least one operating program stored in the operating memory with at least one open-loop control routine, at least one closed-loop routine, at least one calculation routine and at least one evaluation routine. Alternatively, however, it is also conceivable to form a computing unit separately from a control unit.

Furthermore, the control unit 34 comprises a controller unit 52. The controller unit 52 is formed as a steering controller. The controller unit 52 is operatively connected to the computing unit 50. In addition, the controller unit 52 has an active connection to the steering actuator 40. The controller unit 52 is provided to actuate the steering actuator 40 and thereby to control a position of the steering adjustment element 26. Alternatively, it is conceivable to integrate a controller unit directly into a computing unit and to dispense with a separate controller unit.

In addition, the control unit 34 comprises a limiting unit 54. The limiting unit 54 is operatively connected to the computing unit 50. The limiting unit 54 is provided at least to limit the target specification signal 18 for the wheel steering angle adjuster 14 to the maximum wheel steering angle adjustment range 20. In the present case, the limiting unit 54 is provided to limit the target specification signal 18 by means of saturation to the maximum wheel steering angle adjustment range 20. Alternatively, however, it is also conceivable to form a limiting unit separately from a control unit and, for example, to integrate it directly into a wheel steering angle adjuster.

However, a limitation of the target specification signal 18 can cause discontinuities, edges and/or kinks in the signal curve, which may lead to abnormalities in the operation of the steering actuator 40, vibrations in a steering mechanism of the wheel steering angle adjuster 14, and/or acoustic problems during control by means of the controller unit 52.

In order to avoid and/or reduce these problems, an exemplary method for operating the steering system 10 is explained below with reference to FIG. 3. In the present case, the control unit 34, in particular by means of the computing unit 50, is provided to execute the method and for this purpose has, in particular, a computer program with corresponding program code means.

In accordance with the disclosure, the target specification signal 18 for the wheel steering angle adjuster 14 is limited by means of saturation to the maximum wheel steering angle adjustment range 20 and, in particular in the saturation range, is modified in such a way that the modified target specification signal 19 has a continuous and differentiable curve at least in a boundary region of the wheel steering angle adjustment range 20.

For this purpose, the target specification signal 18 is first determined depending on the steering specification at the steering input element 12 and the, in particular predefined and/or adjustable, total steering ratio of the steering system 10 and is then fed to a first limiting element 30 of the limiting unit 54 in order to limit the target specification signal 18 to a limit value correlated with a maximum value of the maximum wheel steering angle adjustment range 20. As already explained, however, a steering specification could in principle also be provided directly by the control unit 34, another control unit in the vehicle and/or a special function. Thereafter, the target specification signal 18, in particular potentially limited, is fed for modification to a filter 24 of the limiting unit 54 with a dynamically adjustable cut-off frequency. In the present case, the filter 24 is formed as a PT2 filter. Lastly, the target specification signal 18, which is in particular potentially limited and/or modified, can be fed to a second limiting element 32 of the limiting unit 54 in order to limit the target specification signal 18 again and to increase operational reliability. In principle, however, a second limiting element could also be omitted. The modified target specification signal 19 generated in this way and based on the target specification signal 18 is fed as a new target specification signal to the controller unit 52, which is provided to control the steering actuator 40 depending on the modified target specification signal 19 and to adjust the modified target specification signal 19. In the present case, the first limiting element 30 is consequently arranged upstream of the filter 24 in circuitry terms and the second limiting element 32 is arranged downstream of the filter 24 in circuitry terms. Alternatively, it is conceivable to implement a corresponding limitation of a target specification signal purely by software. In addition, a filter could also be formed as a filter deviating from a PT2 filter for delaying a target specification signal.

The filter 24 is consequently used to modify the target specification signal 18, wherein the cut-off frequency of the filter 24 is dynamically adapted depending on a target position of the steering adjustment element 26. For this purpose, a difference between the corresponding maximum value 28, 29 of the maximum wheel steering angle adjustment range 20 and the target position of the steering adjustment element 26 is determined, whereby in particular a distance of the steering adjustment element 26 to a corresponding end stop can be determined. In addition, a characteristic curve is advantageously used, wherein an output of the characteristic curve can be additionally filtered again by means of at least one further filter, for example a filter with a constant cut-off frequency and/or a low-pass filter. In the present case, the cut-off frequency is thus selected via the characteristic curve and, in particular, on the basis of the difference between the maximum value 28, 29 of the maximum wheel steering angle adjustment range 20 and the target position of the steering adjustment element 26. In addition, the cut-off frequency is set in such a way that a significant modification of the target specification signal 18 takes place exclusively in the boundary region of the maximum wheel steering angle adjustment range 20, that is to say, in particular, in the region shortly before difference equals zero. The boundary region corresponds here to a sub-region of the maximum wheel steering angle adjustment range 20, which comprises at most 5% of the entire wheel steering angle adjustment range 20 (cf. in particular also FIG. 4b). In addition, a direction of movement of the steering adjustment element 26 can be taken into account in the dynamic adaptation of the cut-off frequency. This can be used, for example, to distinguish between steering into the limitation and/or saturation and steering out of the limitation or saturation. In the present case, the target specification signal 18 is modified both when steering into the limitation and/or saturation and when steering out of the limitation and/or saturation. When steering into the limitation and/or saturation, the target specification signal 18 is modified exclusively in the boundary region of the maximum wheel steering angle adjustment range 20, and when steering out of the limitation and/or saturation, it is modified in a sub-region of the maximum wheel steering angle adjustment range 20 that is extended in comparison to the boundary region of the maximum wheel steering angle adjustment range 20. Advantageously, the output of the characteristic curve can be filtered by means of two different further filters, in particular with different constant cut-off frequencies. In principle, however, a target specification signal could also be modified only when steering into a limitation and/or saturation or when steering out of a limitation and/or saturation. Furthermore, the use of a characteristic curve could also be omitted, in principle.

Figure 4A:
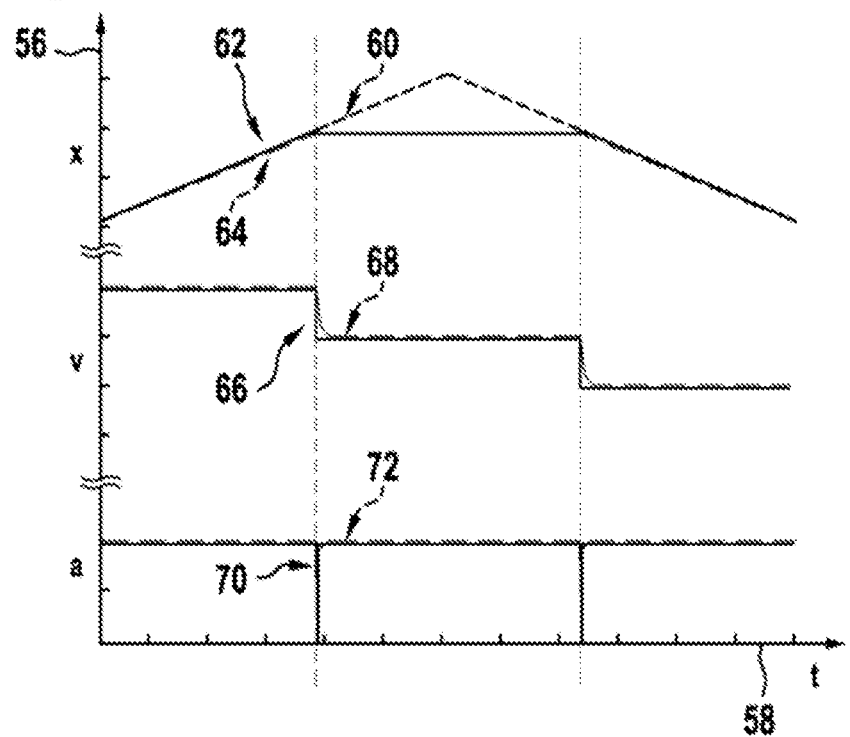
FIGS. 4a-b show exemplary diagrams of various signals associated with the operation of the steering system.
Figure 4B:
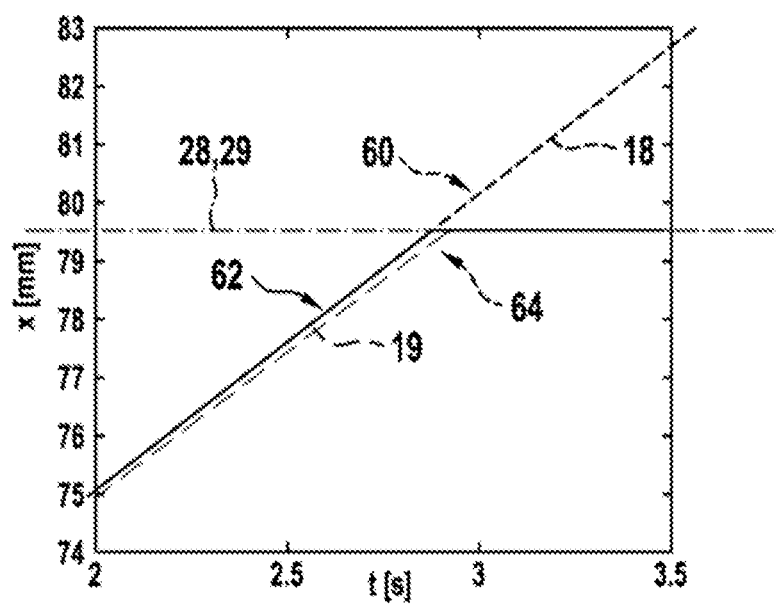

FIGS. 4a ("schematic representation") and 4b ("detailed representation") show exemplary diagrams of various signals associated with the operation of the steering system 10, wherein steering is first performed into the limitation and/or saturation and then out of the limitation and/or saturation. FIG. 4b shows the boundary region of the maximum wheel steering angle adjustment range 20, wherein the maximum value 28, 29 of the maximum wheel steering angle adjustment range 20 is approximately 79.5 mm by way of example. In the present case, FIG. 4b shows the upper signals from FIG. 4a again in a detailed representation. An ordinate axis 56 is formed here as a value axis, while time is shown on an abscissa axis 58. A curve 60 shows a temporal course of the provided setpoint specification signal 18, in particular without limitation and without modification. A curve 62 shows a temporal course of a hypothetical target specification signal with limitation, in particular by the first limiting element 30, and without modification, wherein a discontinuity or kink in the signal course occurs due to the limitation. A curve 64 shows a temporal course of the modified target specification signal 19. A curve 66 shows a speed signal correlated with the hypothetical target specification signal. A curve 68 shows a further speed signal correlated with the modified target specification signal 19. A curve 70 shows an acceleration signal correlated with the hypothetical target specification signal. A curve 72 shows a further acceleration signal correlated with the modified target specification signal 19.

FIG. 4b in particular clearly shows in this context that the target specification signal 18 is limited to the maximum wheel steering angle adjustment range 20 by means of saturation and, in particular in the saturation range and by means of the previously described method for operating the steering system 10, is modified in such a way than the modified target specification signal 19 in the boundary region of the wheel steering angle adjustment range 20 has a continuous and differentiable curve, whereby acoustic problems can be advantageously prevented. Acoustic problems occur with the hypothetical target specification signal in particular due to the high acceleration value in the region of the discontinuity or kink in the signal curve.

Figure 5:
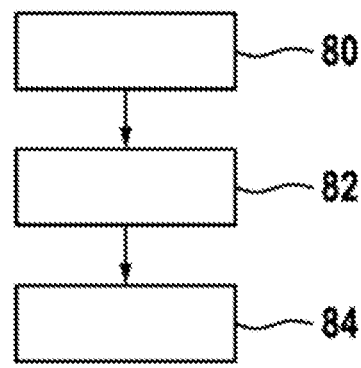
FIG. 5 shows an exemplary flow chart with main method steps of the method for operating the steering system.

Lastly, FIG. 5 shows an exemplary flow chart with the main steps of the method for operating the steering system 10.

In a first method step 80, the target specification signal 18 is determined depending on a steering specification and a total steering ratio of the steering system 10, in particular a predefined and/or adjustable steering ratio.

In a second method step 82, the target specification signal 18 is limited by means of saturation to the maximum wheel steering angle adjustment range 20 and, in particular in the saturation range, is modified in such a way that the modified target specification signal 19 in the boundary region of the wheel steering angle adjustment range 20 has a continuous and differentiable curve.

In a third method step 84, the modified target specification signal 19 is fed to the controller unit 52 and adjusted by controlling the steering actuator 40.

The exemplary flow chart in FIG. 5 is intended in particular to describe a merely exemplary method for operating the steering system 10. In particular, individual method steps can also vary, or additional method steps can be added. In particular, the method step 80 could also be varied in such a way that a target specification signal is provided by a control unit and/or a special function.

The invention claimed is:

1. A method for operating a steering system comprising at least one wheel steering angle adjuster, the method comprising:

influencing and/or changing a wheel steering angle of at least one vehicle wheel depending on a target specification signal correlated with a steering specification using the at least one wheel steering angle adjuster, wherein the at least one wheel steering angle adjuster has a limited maximum wheel steering angle adjustment range for changing the wheel steering angle;

limiting the target specification signal based on saturation to the limited maximum wheel steering angle adjustment range; and modifying the target specification signal, such that the modified, target specification signal has a constant and differentiable curve at least in an edge range of the limited maximum wheel steering angle adjustment range.

2. The method as claimed in claim 1, wherein modifying the target specification signal comprises:

using at least one filter to modify the target specification signal; and dynamically adapting a cut-off frequency of the at least one filter based on a target position of a steering adjustment element of the at least one wheel steering angle adjuster.

3. The method as claimed in claim 2, further comprising:

determining a difference between a maximum value of the limited maximum wheel steering angle adjustment range and the target position of the steering adjustment element for the dynamic adaptation of the cut-off frequency.

4. The method as claimed in claim 2, further comprising:

using a characteristic curve for the dynamic adaptation of the cut-off frequency.

5. The method as claimed in claim 2, further comprising:

using a direction of movement of the steering adjustment element during the dynamic adaptation of the cut-off frequency.

6. The method as claimed in claim 2, wherein the at least one filter is configured and/or the cut-off frequency is set such that a substantial modification of the target specification signal takes place exclusively in a boundary region of the limited maximum wheel steering angle adjustment range.

7. The method as claimed in claim 2, wherein the at least one filter included a PT2 filter.

8. The method as claimed in claim 1, further comprising:

using at least one limiting element to limit the target specification signal to a limit value correlated with a maximum value of the limited maximum wheel steering angle adjustment range.

9. The method as claimed in claim 2, further comprising:

using at least two limiting elements for limiting the target specification signal, wherein a first limiting element of the at least two limiting elements is arranged upstream of the at least one filter in terms of circuitry, and wherein a second limiting element of the at least two limiting elements is arranged downstream of the at least one filter in terms of circuitry.

10. The method as claimed in claim 1, wherein a control unit, is configured to carry out the method.

11. A steering system for a vehicle, comprising:

at least one wheel steering angle adjuster configured to influence and/or change a wheel steering angle of at least one vehicle wheel of the vehicle depending on a target specification signal correlated with a steering specification, the at least one wheel steering angle adjuster having a limited maximum wheel steering angle adjustment range for changing the wheel steering angle; and a control unit configured to operate the at least one wheel steering angle adjuster, the control unit configured to:

limit the target specification signal based on saturation to the limited maximum wheel steering angle adjustment range, and modify the target specification signal, such that the modified target specification signal has a constant and differentiable curve at least in an edge range of the limited maximum wheel steering angle adjustment range.

* * * * *